US010194595B2

(12) United States Patent
Smith

(10) Patent No.: US 10,194,595 B2
(45) Date of Patent: Feb. 5, 2019

(54) BALE EFFECT LINKAGE AND METHODS OF USE

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 567 days.

(21) Appl. No.: 14/894,591

(22) PCT Filed: May 30, 2014

(86) PCT No.: PCT/US2014/040379
§ 371 (c)(1),
(2) Date: Nov. 30, 2015

(87) PCT Pub. No.: WO2014/194287
PCT Pub. Date: Dec. 4, 2014

(65) Prior Publication Data
US 2016/0135375 A1   May 19, 2016

Related U.S. Application Data

(60) Provisional application No. 61/829,219, filed on May 30, 2013.

(51) Int. Cl.
*A01F 15/08* (2006.01)
*A01F 15/07* (2006.01)
(52) U.S. Cl.
CPC .......... *A01F 15/0883* (2013.01); *A01F 15/07* (2013.01); *A01F 2015/077* (2013.01)

(58) Field of Classification Search
CPC ...... A01F 15/08; A01F 15/07; A01F 15/0883; A01F 2015/077
USPC ........................................ 100/88, 87; 56/341
See application file for complete search history.

(56) References Cited

U.S. PATENT DOCUMENTS

| 4,870,812 | A | * | 10/1989 | Jennings | ................. A01F 15/07 100/88 |
| 6,295,797 | B1 | | 10/2001 | Naaktgeboren et al. | |
| 6,332,309 | B1 | * | 12/2001 | Rodewald | ............... A01F 15/07 100/88 |
| 6,644,006 | B1 | | 11/2003 | Merritt et al. | |
| 6,688,092 | B2 | | 2/2004 | Anstey et al. | |
| 6,877,304 | B1 | | 4/2005 | Smith et al. | |

(Continued)

FOREIGN PATENT DOCUMENTS

| EP | 0206889 A1 | 12/1986 |
| EP | 1151657 A1 | 11/2001 |

(Continued)

*Primary Examiner* — Jimmy T Nguyen
(74) *Attorney, Agent, or Firm* — Patrick M. Sheldrake; Peter K. Zacharias

(57) ABSTRACT

A baler ejection system, that may be used with an agricultural harvester, such as a round baler, waste baler, combine, or cotton harvester, uses the motion of a pair of parallel arms that extend transversely from the sidewalls of a bale chamber a set of distinct pivot points. When activated the parallel arms raise to expose an outlet through which the bale may be ejected. A formed bale may become ejected by one or more conveyer belts that exert a rearward force on the bale within the bale chamber.

10 Claims, 8 Drawing Sheets

(56) References Cited

U.S. PATENT DOCUMENTS

| | | | |
|---|---|---|---|
| 7,140,294 B1* | 11/2006 | Anstey | A01F 15/0883 100/88 |
| 7,913,482 B2* | 3/2011 | Olander | A01F 15/0833 100/4 |
| 2004/0031402 A1* | 2/2004 | Viaud | A01F 15/0883 100/88 |
| 2011/0100236 A1* | 5/2011 | Viaud | A01F 15/0833 100/87 |
| 2015/0090131 A1* | 4/2015 | Reijersen Van Buuren | A01F 15/071 100/3 |

FOREIGN PATENT DOCUMENTS

| | | |
|---|---|---|
| EP | 159543 A2 | 11/2005 |
| EP | 1595439 A2 | 11/2005 |

* cited by examiner

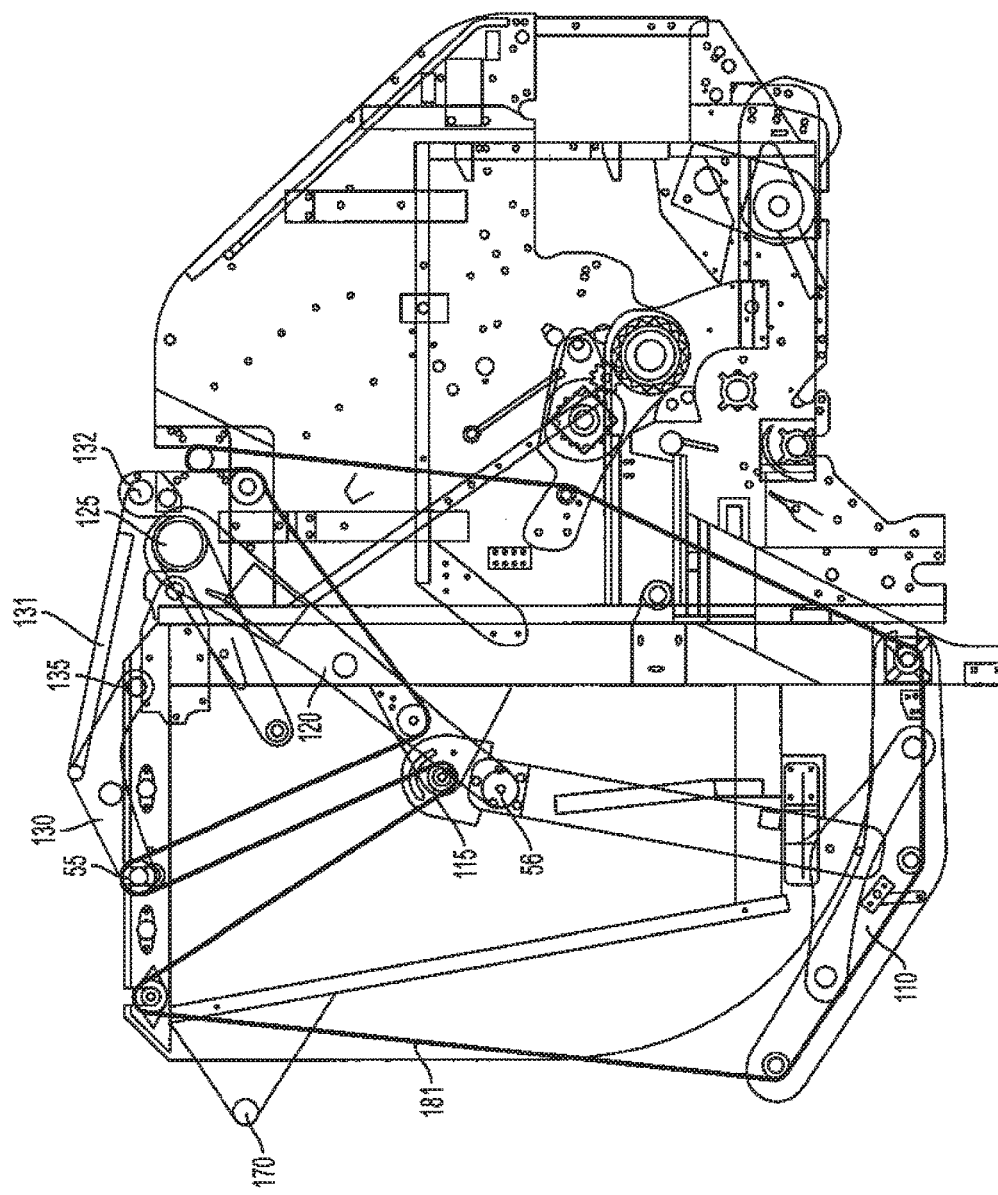

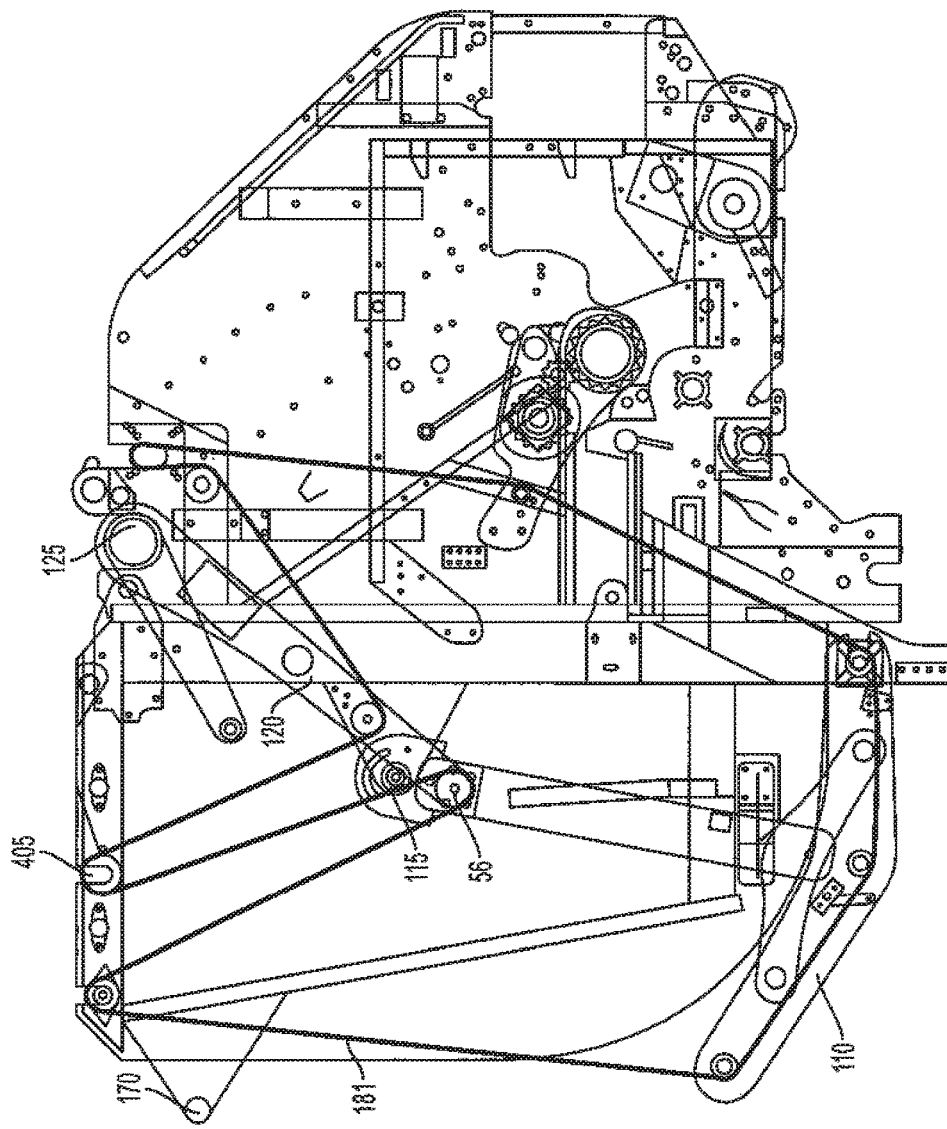

BALE EFFECT LINKAGE AND METHODS OF USE

This application is the US National Stage filing of International Application Serial No. PCT/US2014/040379, filed on May 30, 2014 which claims priority to U.S. Provisional Application with Ser. No. 61/829,219, filed May 30, 2013, each of which is hereby incorporated by reference in its entirety.

TECHNOLOGY FIELD

The present invention relates to a mechanism and system for the quick ejection of a bale in an agricultural harvester, and more particularly, to a bale ejection system comprising a bale guide assembly, a take-up arm, a serpentine system comprising a serpentine arm, and a rear door. The system allows for quick elevation of the arms and quick ejection of a bale when the bars are in a raised position relative to their starting position.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form the crop material into cylindrically-shaped round bales.

More specifically, the pickup of the baler gathers the cut and windrowed crop material from the ground then convey the cut crop material into a bale-forming chamber within the baler. A drive mechanism operates to activate the pickup, auger, and a rotor of the feed mechanism. A conventional baling chamber may consist of a pair of opposing sidewalls with a series of belts that rotate and compress the crop material into a cylindrical shape.

When the bale has achieved a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

The tailgate of the baler typically houses a simple door or panel that is affixed to the tailgate by hinges. In one position, the door or panel remains closed to prevent escape of the harvested bale. In another position, the door or panel can be placed in an open position to facilitate the exit of the harvested bale. Conventional balers require a relatively long period of time (e.g., a downtime), typically in the range of between 10 and 15 seconds, to open the door or panel during operation and evacuation of the bale. The downtime required to operate the door reduces the overall efficiency of the harvesting system and interrupts continuous harvesting. The simple door or panel mechanism typically operates very slowly in a manual or automatic fashion. Once fully open, the weight of the door or panel is typically very heavy, which affects the center of gravity of the equipment, puts additive stress on the tension points, and may cause instability problems if the agricultural harvester is on a hill or slope.

The present invention addresses the above-identified shortcomings of the conventional balers and also includes a design that lowers the weight stress on a single axis or pivot point, thereby increasing the stability of the machine on a slope or hill or angled surface while the machine is in operation. The present invention facilitates maintenance of the agricultural harvester in more confined spaces by allowing access to the bale chamber and back of the agricultural harvester without having to accommodate a large swinging tailgate that is associated with most conventional systems. The present invention also allows for a wider outlet through which the bale may exit the bale chamber by, in some embodiments, pivoting a belt guide assembly that supports the bale in the bale chamber in a closed position to a very high position that does not obstruct bale ejection when in its fully opened position. This high positioning of belt guide assembly allows easy clearance of the bale through the outlet in both conventional and more modern agricultural harvesters. The present invention allows for a higher degree of safety in having the guide assembly roll upward in conjunction with the rear door inward instead of a tailgate being raised or lowered at a difficult center of gravity. There is a need to design a quick bale ejection system with a guide assembly and a take arm by which a baler is opened in a more safe, timely, and efficient manner while also facilitating clearance of the fully formed bales of harvested material in a lateral vector.

SUMMARY OF THE INVENTION

Some embodiments of the present invention address and overcome one or more of the above shortcomings and drawbacks, by providing bale ejection system with increased efficiency and speed for smooth operation. The bale ejection system uses the motion of a belt guide assembly that extends transversely from the sidewalls of a bale chamber at a distinct pivot points. When activated by the operator of the bale ejection system, the belt guide assembly attached to tension actuators and stationary sidewalls raises contemporaneously with a take-up arm positioned at the top of the bale chamber to expose an outlet through which the bale may be ejected. In some embodiments, a netted bale becomes ejected by one or more conveyer belts or baling belts that exert a rearward force on the bale within the bale chamber. The bale becomes ejected through the outlet onto a field upon which the bale ejection system is operating.

In some embodiments, the invention relates to a bale ejection system comprising: a bale chamber comprising a first sidewall and a second sidewall; an outlet at the rear end of the bale chamber; and a belt guide assembly positioned over the outlet, the belt guide assembly movable among a closed position and one or more open positions, comprising: a pair of arms extending transversely from and affixed to a pair of pivot points on the first and second sidewalls; a pair of bars affixed to the pair of arms, wherein the pair of bars is arranged in a parallel fashion between which at least one roll rotates on a stationary axis. While the belt guide assembly is in its fully closed position, the at least one roll supports a bale in a bale chamber during operation. In some embodiments, the pair of bars are aligned in a non-parallel fashion. In some embodiments, the bale ejection system comprises at least one serpentine system that comprises at least one roll positioned at the top of the bale ejection system and generally above the bale chamber which is in operable connection with a take-up arm pivotally mounted between the side walls of the system, wherein the at least one roll is movable in an upward and downward position by upward and downward radial movement of the take-up arm and wherein the take-up arm pivots upward and downward simultaneously or substantially simultaneously with the opening and closing of the belt guide assembly.

In some embodiments, the invention relates to a bale ejection system comprising: a bale chamber comprising a first sidewall and a second sidewall; an outlet at the rear end of the bale chamber; and a belt guide assembly positioned over the outlet, the belt guide assembly movable among a closed position and one or more open positions, comprising: a first pair of arms extending transversely from and affixed to a first pair of pivot points on the first and second sidewalls; one or more fixed members positioned at a distance from the first pair of pivot points defined by the length of the first pair of arms; and one or a plurality of bars affixed to the one or more fixed members. In some embodiments, the one or plurality of bars are aligned in a parallel fashion. In some embodiments, the one or plurality of bars are not aligned in a parallel fashion but are positioned transversely between the one or more fixed members in some embodiments, at least one of the bars supports a stationary axis upon which the at least one roller is rotatably mounted. In some embodiments, the belt guide assembly comprises at least two, three, or more bars positioned transversely between the pair of fixed members and wherein each of the bars supports a stationary axis upon which the at least two, three, or more rollers are rotatably mounted. In some embodiments, the belt guide assembly comprises at least one, two, three, or more rollers that define the bottom of the bale chamber and support the weight of a bale being formed in the bale chamber when the belt guide assembly is in it fully closed position.

In some embodiments, the invention relates to a bale ejection system comprising: a bale chamber comprising a first sidewall and a second sidewall; an outlet at the rear end of the bale chamber; and a belt guide assembly obstructing the outlet in its fully closed position, the belt guide assembly movable among a closed position and one or more open positions, comprising: at least a single pair of arms extending in parallel transversely from and affixed to a first pair of pivot points on the first and second sidewalls; one or more fixed members positioned at a distance from the first pair of pivot points defined by the length of the at least single pair of arms; and at least one bar affixed to the one or more fixed members. In some embodiments, the belt guide assembly comprises at least one, two, three, or more bars. In some embodiments, the belt guide assembly comprises a plurality of bars, wherein at least one of the bars supports a stationary axis upon which the at least one roller is rotatably mounted. In some embodiments, the belt guide assembly comprises a plurality of bars, wherein at least two of the bars supports a stationary axis upon which two rolls are rotatably mounted. In some embodiments, the belt guide assembly comprises a plurality of bars, wherein at least two of the bars supports a stationary axis upon which two rolls are rotatably mounted and are arranged in a parallel fashion to one another. In some embodiments, the belt guide assembly comprises a plurality of bars, wherein at least two of the bars supports a stationary axis upon which at least two rolls are rotatably mounted and wherein the at least two rolls support the weight of a bale forming in the bale chamber when the belt guide assembly is in its fully closed position.

In some embodiments, the invention relates to a bale ejection system disclosed herein, wherein the bale ejection system is adapted for use in an agricultural harvester comprising: a bale chamber comprising a first sidewall and a second sidewall; an outlet at the rear of the bale chamber; a take-up arm positioned at the top of the baler; at least a first serpentine system arranged for the bale chamber, the first serpentine system comprising: a plurality of baling belt rollers in operable contact with one or more baling belts, the plurality of baling belt rollers comprising at least one baling belt roller in operable contact with the take-up arm and movable in a direction defined by a pivoting movement of the take-up arm, independent of movement of any other baling belt rollers in the baler; and a belt guide assembly, the belt guide assembly movable among a closed position and one or more open positions, comprising: a first pair of arms extending transversely from and affixed to a first pair of pivot points on the first and second sidewalls; one or more fixed members positioned at a distance defined by the length of the first and second pair of arms; and at least one roller rotatably mounted upon an axis transverse to the one or more fixed members. In some embodiments, the bale ejection system described herein comprises a rear door at the most rearward end of the bale ejection system. The function of the rear door is to protect the baling belts from outside incursion or disturbance and to prevent the operator or other individuals standing near the rear of the bale system from becoming injured by the bale ejection system while it is in operation. In some embodiments, the rear door is attached to a baler at a second pair of pivot points. In some embodiments, the second pair of pivot points are positioned on a first and second sideframes of the baler.

In some embodiments, the invention relates to a baler ejection system with one or more fixed members that comprise at least a first roller; wherein the pair of bars are affixed to each end of the first roller on a set of rotatable axes. In some embodiments, the invention relates to the one or more fixed members that comprise at least a first roller and a second roller; wherein the pair of bars are affixed to each end of the first roller and the second rollers on a set of rotatable axes. In some embodiments, the invention relates to a baler ejection system with one or more fixed members that comprise at least a first roller; wherein the pair of bars are affixed to each end of the first roller on a set of rotatable axes and wherein the pair of bars are oriented in parallel to one another. In some embodiments, the invention relates to the one or more fixed members that comprise at least a first roller and a second roller; wherein the pair of parallel bars extends orthogonally to and are affixed to each end of the first roller and the second rollers on a set of rotatable axes.

In some embodiments, the invention relates to a bale ejection system or agricultural harvester comprising: a bale chamber comprising a first sidewall and a second sidewall; an outlet at the rear end of the bale chamber; and a belt guide assembly, the belt guide assembly movable among a closed position and one or more open positions, comprising: a pair of arms extending transversely from and affixed to a first pair of pivot points on the first and second sidewalls; one or more fixed members affixed to the pair of arms; at least one bar affixed transversely between the one or more fixed members. In some embodiments, the invention relates to a bale ejection system or agricultural harvester further comprising a serpentine system comprising: a plurality of rolls and one or a plurality of baling belts to convey rotation of a bale in the bale chamber, wherein at least a first movable roll is in operable contact with a serpentine arm, wherein at least a second movable roll is in operable contact with the take-up arm; and wherein the first and second movable rolls impart tension to the baling belts when the first and second movable rolls are in a partially or fully raised position. In some embodiments, the invention relates to a bale ejection system or agricultural harvester comprising a serpentine system further comprising a back wrap roll positioned in the upper rearward corner of the harvester or system. In some embodiments, the invention relates to a bale ejection system or agricultural harvester comprising a serpentine system further comprising a back wrap roll positioned in the upper rearward corner of the harvester or the system wherein the back wrap roll takes up slack in the baling belts when the belt guide assembly pivots upward more than half the total distance the belt guide assembly may move at an angle from its fully closed position. In some embodiments, the pair of arms of the belt guide assembly is operably coupled to a hydraulic system for facilitating upward movement of the first pair of arms around the first pair of pivot points. In some embodiments, the bale ejection system or agricultural harvester described herein comprises a take-up arm operably coupled to a spring-loaded mechanism for facilitating upward movement of the take-up arm around a pair of take-up arm pivot points.

In some embodiments, the bale ejection system of the present invention is designed for use in an agricultural harvester, such as a round baler, a waste baler, a cotton harvester, or a combine.

In some embodiments, the bale ejection system uncovers the outlet at one end of the bale chamber through which the bale becomes ejected from the bale chamber when the belt guide assembly is raised upward to a partially open or fully open position from its closed position. In some embodiments, the bale ejection system further comprises a take-up arm comprising one or a plurality members fixed to a pair of take-up arm pivot points and wherein the one or a plurality of members fixed to the pair of take-up arm pivot points is in operable contact with at least one movable roll of the serpentine system. In some embodiments, the take-up arm raises or lowers the at least one movable roll of the serpentine system. In some embodiments, the take-up arm raises the at least one movable roll of the serpentine system when the belt guide assembly is raised simultaneously with or substantially simultaneously with serpentine arm. The function of the take-up arm is to reduce the slack in the one or plurality of baling belts when the serpentine arm is raised upward into a partially open or fully open position and the upward movement of the serpentine arm fails to account for all of the slack in the one or plurality of baling belts of the serpentine system.

In some embodiments, the invention relates to a system that comprises a belt guide assembly, wherein the belt guide assembly can move from a closed position to a fully open position at about 100 degrees from its fully closed position. In some embodiments, the invention relates to a system that comprises a belt guide assembly, wherein the belt guide assembly can move from a closed position to a fully open position at about 105 degrees from its fully closed position. In some embodiments, the invention relates to a system that comprises a belt guide assembly, wherein the belt guide assembly can move from a closed position to a fully open position at about 110 degrees from its fully closed position. In some embodiments, the invention relates to a system that comprises a belt guide assembly, wherein the belt guide assembly can move from a closed position to a fully open position at about 115 degrees from its fully closed position. In some embodiments, the invention relates to a system that comprises a belt guide assembly, wherein the belt guide assembly can move from a closed position to a fully open position at about 120 degrees from its fully closed position. In some embodiments, a fully open position is from about 100 degrees to about 120 degrees from a fully closed position. In some embodiments, a fully open position is from about 105 degrees to about 120 degrees from a fully closed position. In some embodiments, a fully open position is from about 110 degrees to about 120 degrees from a fully closed position. In some embodiments, a fully open position is from about 115 degrees to about 120 degrees from a fully closed position. In some embodiments, a fully open position is from about 100 degrees to about 115 degrees from a fully closed position. In some embodiments, a fully open position is from about 100 degrees to about 110 degrees from a fully closed position. In some embodiments, a fully open position is from about 100 degrees to about 105 degrees from a fully closed position. In some embodiments, the invention relates to a system that comprises a belt guide assembly, wherein the belt guide assembly can move from a closed position to a fully open position at about 115 degrees from its fully closed position and wherein the fully closed position is defined by the pair of parallel fixed members (or guide assembly sidewalls) aligned in a vertical or substantially vertical position. In some embodiments, the invention relates to a system or agricultural harvester described herein that comprises a belt guide assembly, wherein the belt guide assembly can move from a closed position to a fully open position in less than thirty seconds. In some embodiments, the invention relates to a system or agricultural harvester described herein that comprises at least one clamping mechanism that secures the belt guide assembly in it fully closed position through operable contact with at least one arm of the pair of arms extending from the first pair of pivot points. In some embodiments, the invention relates to a system or agricultural harvester described herein that comprises a belt guide assembly movable in a closed and one or more open positions and further comprises a motor and at least one tensioning actuator operatively coupled to the first pair of arms for facilitating the upward or downward movement of the belt guide assembly.

In some embodiments, the invention relates to an agricultural harvester or bale ejection system comprising:
  a bale chamber comprising a first sidewall and a second sidewall;
  an outlet at the rear of the bale chamber;
  a take-up arm positioned at the top of the baler;
  at least a first serpentine system arranged for the bale chamber, the first serpentine system comprising:
    a plurality of baling belt rollers in operable contact with one or more baling belts, the plurality of baling belt rollers comprising at least one baling belt roller in operable contact with the take-up arm and movable in a direction defined by a pivoting movement of the take-up arm, independent of movement of any other baling belt rollers in the baler; and
  a belt guide assembly, the belt guide assembly movable among a closed position and one or more open positions, comprising:
    a first pair of arms extending transversely from and affixed to a first pair of pivot points on the first and second sidewalls;
    one or more fixed members positioned at a distance defined by the length of the first and second pair of arms; and
    at least one roller rotatably mounted upon an axis transverse to the one or more fixed members
  wherein the belt guide assembly uncovers the outlet at the rear of the bale chamber through which the bale becomes ejected from the bale chamber when the belt guide assembly is raised upward from its closed position.

In some embodiments, the invention relates an agricultural harvester or bale ejection system comprising:

a bale chamber comprising a first sidewall and a second sidewall;

an outlet at the rear of the bale chamber;

a take-up arm positioned at the top of the baler;

at least a first serpentine system arranged for the bale chamber, the first serpentine system comprising:

a plurality of baling belt rollers in operable contact with one or more baling belts, the plurality of baling belt rollers comprising at least one baling belt roller in operable contact with the take-up arm and movable in a direction defined by a pivoting movement of the take-up arm, independent of movement of any other baling belt rollers in the baler; and a belt guide assembly, the belt guide assembly movable among a closed position and one or more open positions, comprising:

a first pair of arms extending transversely from and affixed to a first pair of pivot points on the first and second sidewalls;

one or more fixed members positioned at a distance defined by the length of the first and second pair of arms; and at least one roller rotatably mounted upon an axis transverse to the one or more fixed members;

wherein the belt guide assembly uncovers the outlet at the rear of the bale chamber through which the bale becomes ejected from the bale chamber when the belt guide assembly is raised upward from its closed position; and wherein the bale chamber is defined in a space between the first sidewall, the second sidewall, the belt guide assembly, and a serpentine system comprising a plurality of rolls positioned between and attached to the first and second sidewalls; wherein the plurality of rolls support one or a plurality of baling belts.

In some embodiments, the invention relates to an agricultural harvester or bale ejection system comprising:

a bale chamber comprising a first sidewall and a second sidewall;

an outlet at the rear of the bale chamber;

a take-up arm positioned at the top of the baler;

at least a first serpentine system arranged for the bale chamber, the first serpentine system comprising:

a plurality of baling belt rollers in operable contact with one or more baling belts, the plurality of baling belt rollers comprising at least one baling belt roller in operable contact with the take-up arm and movable in a direction defined by a pivoting movement of the take-up arm, independent of movement of any other baling belt rollers in the baler; and a belt guide assembly, the belt guide assembly movable among a closed position and one or more open positions, comprising:

a first pair of arms extending transversely from and affixed to a first pair of pivot points on the first and second sidewalls;

one or more fixed members positioned at a distance defined by the length of the first and second pair of arms; and at least one roller rotatably mounted upon an axis transverse to the one or more fixed members;

wherein the belt guide assembly uncovers the outlet at the rear of the bale chamber through which the bale becomes ejected from the bale chamber when the belt guide assembly is raised upward from its closed position; wherein a pair of parallel bars extend orthogonal to and affixed to the one or more fixed members and define the axis upon which the least one roller is rotatably mounted.

In some embodiments, the baler further comprises a motor operatively coupled to the first pair of arms and/or the second pair of arms for facilitating the upward or downward movement of the belt guide assembly.

In some embodiments, the invention relates to the method of manufacturing a bale ejection system disclosed herein comprising: affixing a first pair of arms extending transversely from a first pair of pivot points on a first sidewall and a second sidewall; wherein the first sidewall and second sidewall define the bale chamber. In some embodiments, the invention relates to the method of manufacturing a baler comprising: a bale chamber comprising a first sidewall and a second sidewall; an outlet at the rear of the one or more bale chambers; and a belt guide assembly, the belt guide assembly movable among a closed position and one or more open positions, comprising: a first pair of arms extending transversely from and affixed to a first pair of pivot points on the first and second sidewalls; one or more fixed members positioned at a distance defined by the length of the first pair of arms; and one or a plurality of rolls pinned transversely to and between the pair of fixed members, wherein the belt guide assembly uncovers the outlet at the rear of the bale chamber through which the bale becomes ejected from the bale chamber when the retractable belt guide assembly is raised upward from its closed position.

The invention also relates to a method of harvesting crop material said method comprising operating the agricultural harvester or system disclosed herein over crop material.

BRIEF DESCRIPTION OF THE DRAWINGS

The foregoing and other aspects of the present invention are best understood from the following detailed description when read in connection with the accompanying drawings. Embodiments of the present invention are illustrated by the drawings, however, it is understood that the invention is not limited to the specific instrumentalities disclosed. Included in the drawings are the following Figures:

FIG. 3A-3D shows a side cross-sectional view of an exemplary bale wrapping and ejection system in various stages of operation and without a rear door.

FIG. 4 shows an embodiment of a side cross-sectional view of the bale wrapping and ejection system where the take-up arm has been replaced by a single roller.

DETAILED DESCRIPTION OF ILLUSTRATIVE EMBODIMENTS

Figure 1:
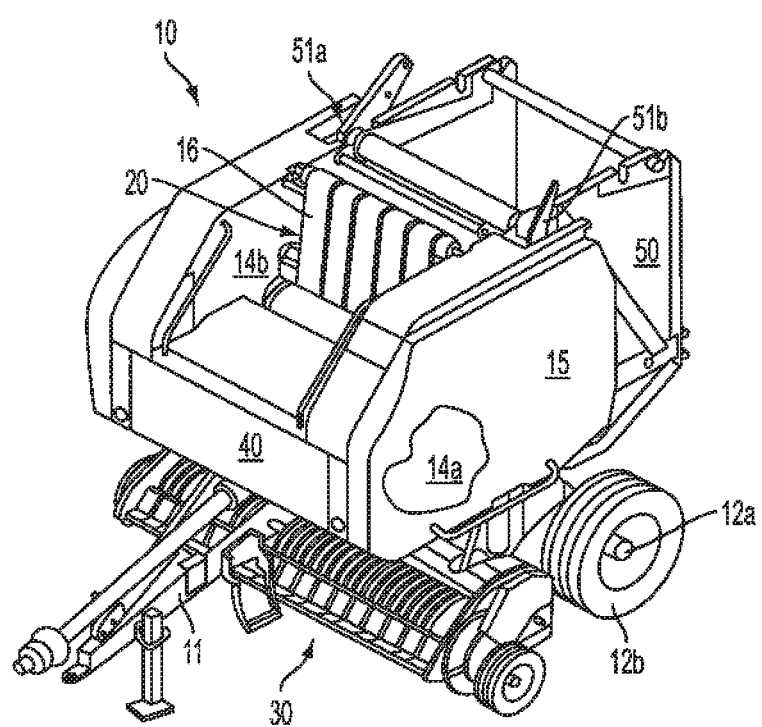
FIG. 1 is a forward and top perspective view of a round baler of the type in which the bale ejection system of the present invention may be integrated.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Furthermore, the various components shown or described herein for any specific application of this invention can be varied and the practice of a specific application of any element may already be widely known or used in the art by persons skilled in the art and each will likewise not therefore be discussed in significant detail.

Agricultural balers, such as round balers, are well known in the agricultural industry, and the instant invention can be used with substantially any of such machines. Reference is made, for example, to U.S. Pat. Nos. 6,877,304; 6,688,092; 6,644,006 and 6,295,797 that illustrate such balers, the disclosures of which is incorporated herein by reference in their entirety. Embodiments of the present invention are particularly well suited, but in no way limited to, use with agricultural balers. The present invention may also find utility in agricultural harvesters including, for example, a waste baler, a cotton harvester, or a combine.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

As used herein, the term "belt guide assembly" means a device pivotally mounted on two side walls of a bale chamber wherein the device comprises a pair of arms extending from a pair of pivot points.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

As used herein the term "substantially simultaneously" means, in relation to a first and a second action, that both the first and second actions occur at the same time or the first action and second action occur sequentially within a relatively short time period. In some embodiments, the time period between successive action is at least about 1, 2, 3, 4, 5, 6, 7, 8, 9, 10, 15, 20, 25, or 30 seconds.

In some embodiments, the belt guide assembly is rotated upward approximately 115 degrees for bale ejection. In the lowered position, the rolls attached to the belt guide assembly form the lower rear path of the baling belts and help support the bale while it is being formed. When in the raised position, the rolls are at a height which allows the bale to roll without obstruction out of the chamber. Also in the raised position at least 1 of the rolls on the belt guide assembly is above the other fixed rolls on the baler from its fully closed position. In order to maintain belt tension with the belt guide assembly fully raised, an additional back wrap roll is included at the upper rear corner of the baler. The belts only engage this back wrap roll when the belt guide assembly is raised about half way and beyond. In some embodiments, an additional spring loaded take-up arm is positioned above the serpentine arm and serves to remove any slack in the belts created by the belt guide assembly moving faster than the current serpentine arm can react. In some embodiments, a rotating shield is included in the rear of the baler to cover the moving belts. In order for the shield to raise high enough to avoid the ejecting bale but not interfere with the spring loaded take up arm, the shield rotates a smaller amount than the belt guide assembly. This is achieved by controlling the shield motion with the belt guide assembly motion but having the axis of the two members offset from each other. In some embodiments, the position of the serpentine arm pivot point (or pair of pivot points or pivot axis) is proximal to the take-up arm pivot point and both pivot points are in the upper portion of the agricultural harvester or system described herein but forward of the bale chamber so that upper and rear end of the baler has enough space to accommodate the belt guide assembly in a high position. In some embodiments, the serpentine arm pivot point and the take-up arm pivot point are positioned in the top portion of the baler and substantially frontward of the bale chamber. In some embodiments, the harvester or system comprises a first pair of pivot points or first pivot axis that corresponds to the pivot axis of the belt guide assembly. In some embodiments, the harvester or system comprises a second pair of pivot points or second pivot axis that corresponds to the pivot axis of the rear door. In some embodiments, the harvester or system comprises a third pair of pivot points or third pivot axis that corresponds to the pivot axis of the serpentine arm. In some embodiments, the harvester or system comprises a fourth pair of pivot points or fourth pivot axis that corresponds to the pivot axis of the take-up arm.

In some embodiments, the bale ejection system described herein is adapted for use in an agricultural harvester described in U.S. patent application Ser. No. 13/308,304, which is incorporated by reference in its entirety.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyer belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. For clarity and purposes of the instant invention, the tailgate 50 and hydraulic mechanism that controls the upward swing of the tailgate are replaced by the belt guide assembly comprising the belt mechanism described (depicted in FIG. 2) and two hydraulic tensioning actuators on opposite sides of the sidewalls, which, in some embodiments of the present invention, are positioned between the sidewalls and the main frame of the baler.

Figure 2A:
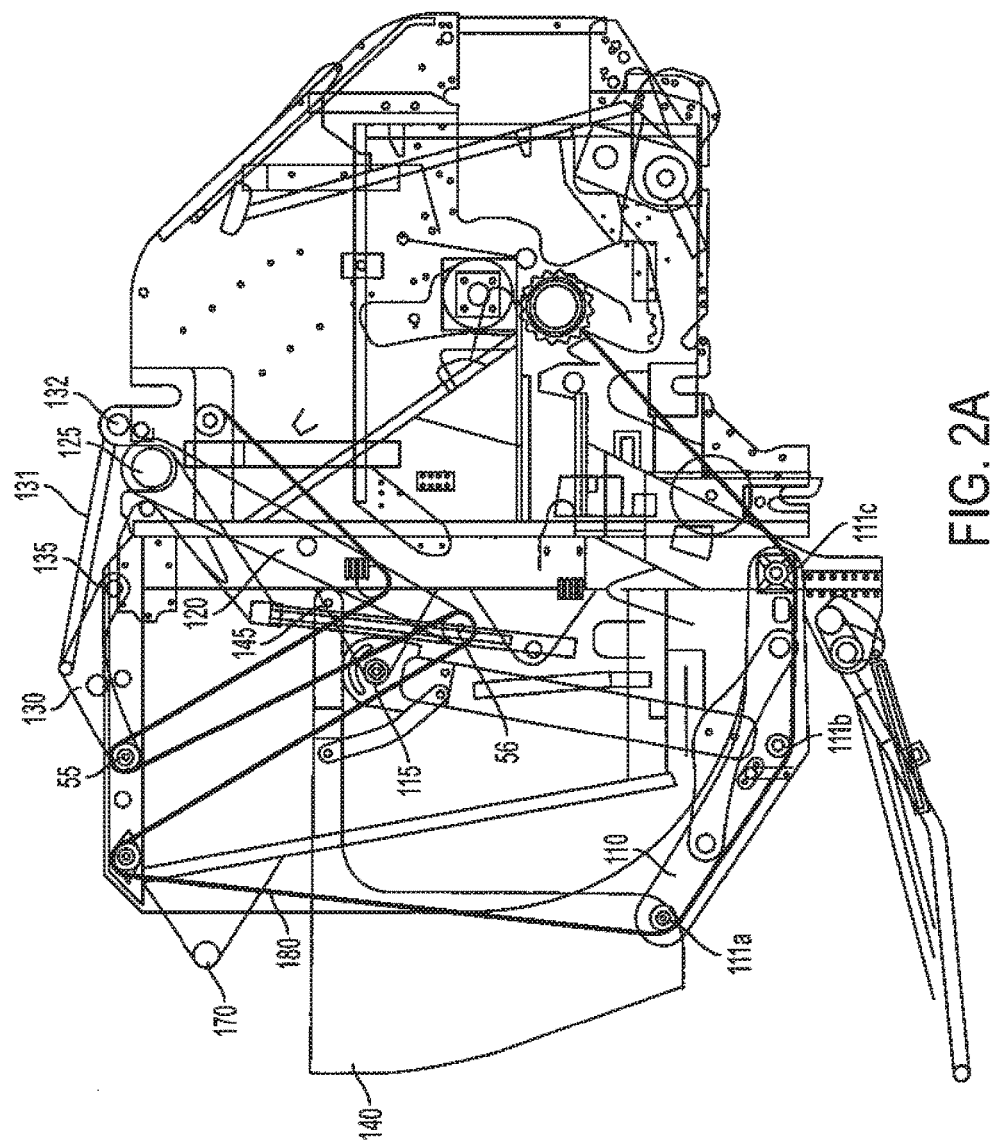
FIG. 2A shows a side cross-sectional view of an exemplary bale wrapping and ejection system in the closed position.

FIG. 2A depicts a side cross-sectional view of an illustrative example of the agricultural harvester with the rear door 140 and belt guide assembly 110 in their fully closed position, where the front of the harvester (in this case a baler) is depicted on the right hand side of the page and the rear end of the baler is depicted on the left hand side of the page. A pair of arms (only one depicted in side view) from the belt guide assembly 110 extend from the belt guide assembly pivot point 115 to fixed members affixed to the end of the arms most distal from the belt guide assembly pivot point 115. Throughout this disclosure, the fixed members of the belt guide assembly can also be referred to as the belt guide sidewalls. In some embodiments, the belt guide assembly 110 comprises a parallel pair of belt guide assembly sidewalls. In the depicted embodiment, three rolls 111a, 111b, and 111c are pinned between the guide assembly sidewalls that define a bottom portion of the bale chamber and support the weight of a bale forming in the bale chamber during operation. A rear door 140 is fixed to the depicted baler by forward extending members and pivotally mounted at the rear door pivot point 145 at a height near the relative middle of the baler. The baler comprises a serpentine system comprising a plurality of rolls that are either in operable contact with the bale in the bale chamber or exact tension to one or a plurality of baling belts 180 supported by the rolls that are in contact with the bale while the baler is in operation. At least two of the rolls 55, 56 are movable in an upward and downward direction through operable contact and radial movement of the serpentine arm 120 or the take-up arm 130. Radial movement of the serpentine arm 120 and the take-up arm 130 is achieved by the each of the disclosed components being pivotally mounted at a position in the upper front portion of the baler. The serpentine arm 120 is pivotally mounted to the baler at the serpentine pivot point 125, and the take-up arm 130 is pivotally mounted to the baler at the take-up arm pivot point 135. In the depicted embodiment, the take-up arm 130 is spring loaded by a spring 131 mounted between the take-up arm and a spring mount 132. It should be noted that it is possible that the serpentine arm 120 and the take-up arm 130 may comprise either one fixed member that is attached to the movable rolls, a pair of members, or a plurality of members each of which mechanically link the respective pivot points to the first and second movable rolls 55, 56. When the operator desires to eject a bale from the bale chamber, the operator may engage a controller to lift the belt guide assembly 110 to a raised position.

Figure 2B:
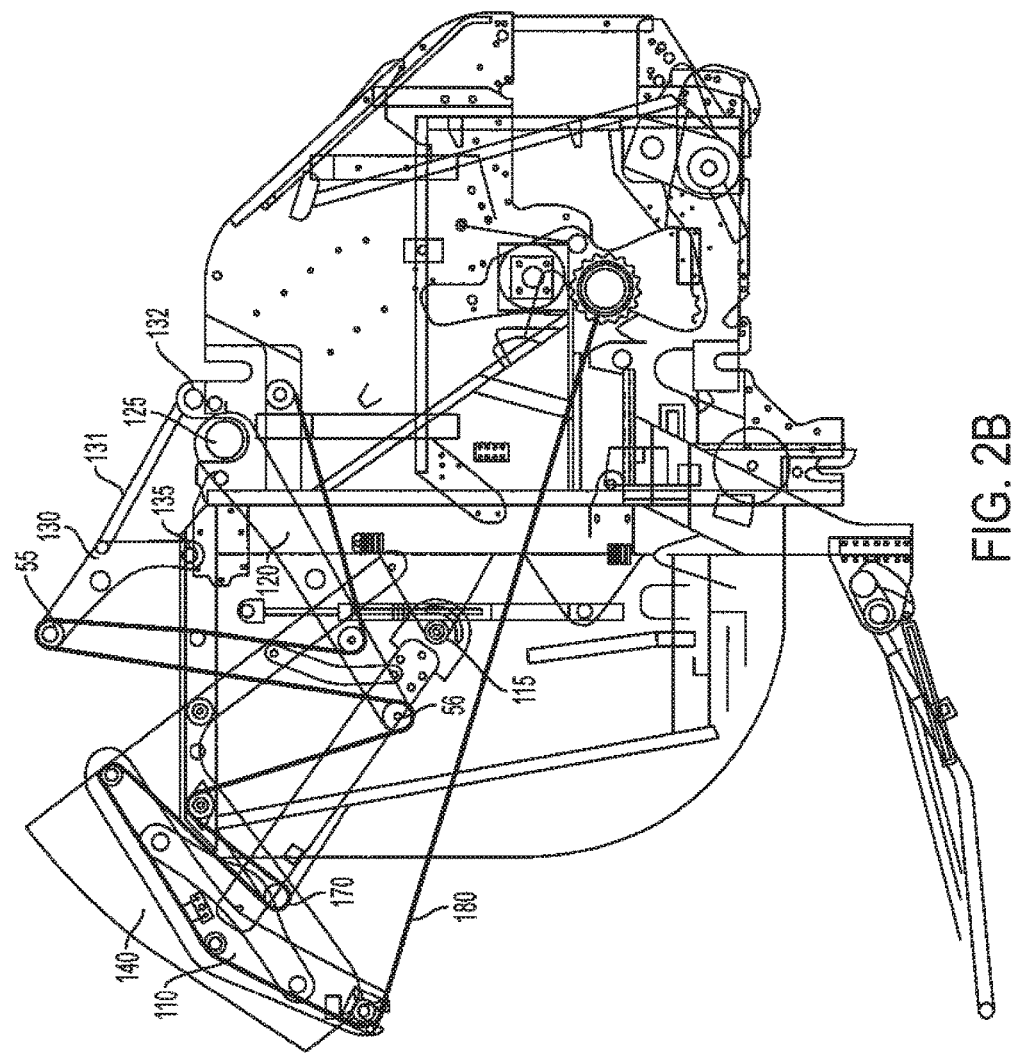
FIG. 2B shows a side cross-sectional view of an exemplary bale wrapping and ejection system in a fully open position. A rear door, which is positioned behind the bale chamber, partially covers the bale ejection outlet so that the baling belts are not exposed to the area immediately outside the baler.

FIG. 2B depicts the same side cross-sectional view of the baler depicted in FIG. 2A except that the belt guide assembly 110 is depicted in its fully raised position. The operator of the baler may engage at least one controller in electronic communication with a lifting means (such as a motor and at least one tensioning actuator or a hydraulic cylinder operatively coupled to arms of the belt guide assembly 110, serpentine system, and/or the rear door 140) to raise the belt guide assembly 110, rear door 140, and/or serpentine arms 120. In some embodiments, each set of lifting means may be engaged independent of the other lifting means. When a bale is fully formed or nearly fully formed, the operator may engage the lifting means for the belt guide assembly 110, serpentine arm 120, and rear door arms simultaneously or substantially simultaneously so that the belt guide assembly 110, serpentine arm 120, and rear door 140 swing upward in direction determined by the radial distance of the arms pivoting at the serpentine arm pivot point 125, the rear door pivot point 145 and the belt guide assembly pivot point 115. When the belt guide assembly moves upward, slack in the surrounding baling belts 180 will increase. A vast majority of the slack in the baling belts 180 is reduced by the upward movement of the serpentine arm 120 and the movable roll 56 attached to the end of the serpentine arm 120. Additional slack is removed from the baling belts 180 of the serpentine system by the back wrap roll 170 positioned substantially behind the other plurality of baling belt rolls in upper rear portion of the baler. Additional slack created by the baling belts 180 that is not removed by the raised serpentine arm 120 is removed by the take-up arm 130 which, in some embodiments, is spring loaded to raise in sequence after or substantially simultaneously with the upward movement of the belt guide assembly 110 and serpentine arm 120. In the depicted embodiment, the take-up arm 130 is spring loaded by the spring 131 mounted between the take-up arm 130 and the spring mount 132. In its fully raised position depicted in FIG. 2B, the belt guide assembly is positioned at or about 115 degrees from the vertical created by the assembly in its fully closed position and extends upward and rearward in relation to the baler. The serpentine arm 120, which originally points in a substantially downward and slightly rearward direction from the serpentine arm pivot point 125, moves to a more substantially rearward direction but not horizontal in reference to the plane of the baler. The movable roll 56 in operable contact with the serpentine arm 120 is positioned rearwardly and upwardly relative to its position when the belt guide assembly 110 is in its fully closed position. The take-up arm 130 in its fully open position is positioned at an angle well above but not more than 90 degrees above the sideframes of the baler and pulls the movable roll 55 at a position higher than other components of the baler and well above the bale chamber. The position of the serpentine arm pivot point 125 and the take-up arm pivot point 135, which appear in close proximity at the upper and front portion of the baler, allow for especially high clearance on the belt guide assembly 140. The wide angle of the belt guide assembly 140 in its fully open position allow for easy clearance of the bale upon ejection. It should be noted that, in some embodiments, excess slack in the system is taken up by the rest of the serpentine system of rolls in the front of the baler (not depicted).

FIGS. 3A, 3B, 3C, and 3D depict the function of the components of an exemplary cross-sectional view of a harvester (in this case, a baler) during operation. It is understood that the components of the harvester may function in a serial, stepwise, or simultaneous fashion, but that all steps described in FIGS. 3A, 3B, 3C, and 3D illustrate one embodiment of a single cycle for the purposes of the invention. The harvester depicted in FIGS. 3A, 3B, 3C, and 3D comprises: a belt guide assembly 110 and belt guide assembly pivot point 115, a moveable roll 56 attached to the end of a serpentine arm 120 and a serpentine arm pivot point 125, a back wrap roll 170, and a movable roll 55 attached to the end of take-up arm 130, which is connected to a take-up arm pivot point 135, and which is operably connected to a spring mount 132 by a spring 131. The embodiment also comprises continuous and unending baling belts 181 of the serpentine system.

FIG. 3A depicts the harvester with the belt guide assembly 110 in a fully closed position, and the take-up arm 130 is in a lowered position. This arrangement allows for the formation of a bale in a bale chamber. When an operator desires to eject a bale from the bale chamber, the operator may engage a controller to lift the belt guide assembly 110 to a raised position. The movable roll of the take-up arm is in a stationary position.

Figure 3B:
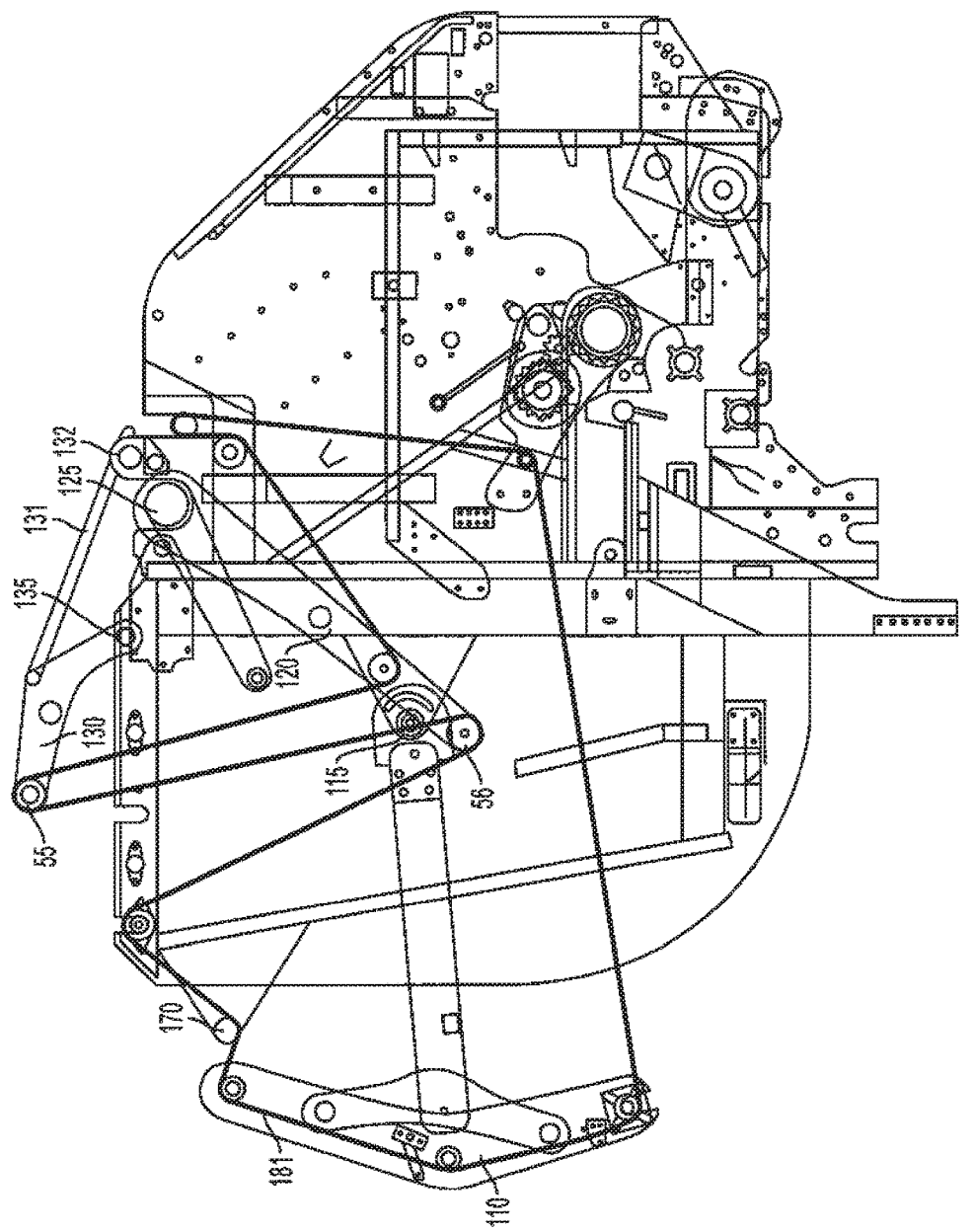

FIG. 3B depicts the harvester with the belt guide assembly 110 in a partially raise position. As the belt guide assembly 110 moves upward in a radial motion around the belt guide assembly pivot point 115, slack in the surrounding baling belts 181 increases. In response, the take-up arm 130 moves upward, allowing the movable roll of the take-up arm 55 to eliminate the slack in the baling belts 181. Additionally, a certain amount of slack is eliminated as the baling belts 181 come in contact with the back wrap roll 170 during the upward arc of the belt guide assembly 110.

Figure 3C:
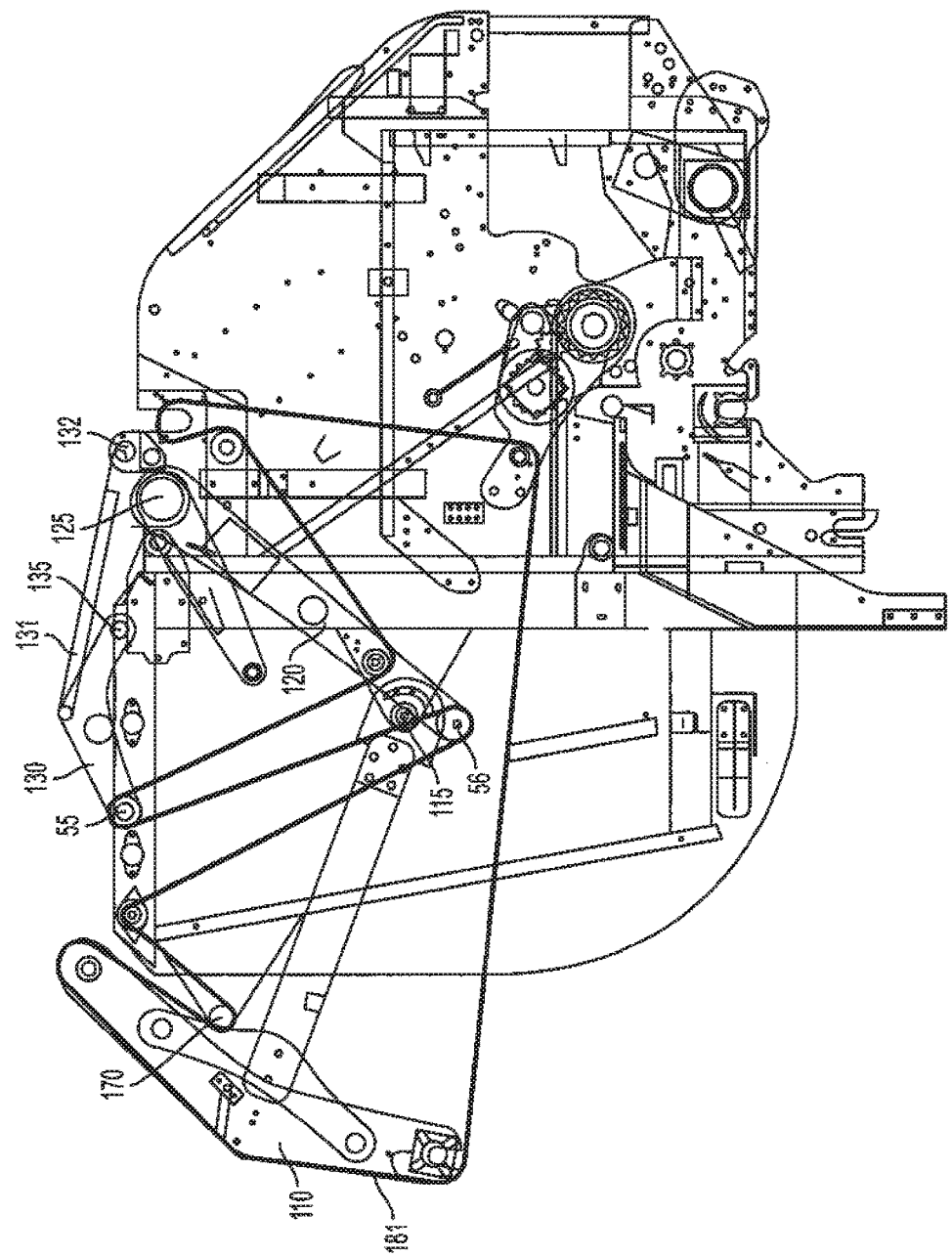

FIG. 3C depicts the harvester with the belt guide assembly 110 in a fully raised position. The take-up arm 130 is in a lowered position, as the amount of slack in the surrounding baling belts 181 has decreased. This arrangement allows for the ejection of a bale in the bale chamber. In some embodiments, when an operator desires to close the bale chamber, such as for the formation of a new bale, the operator may engage a controller to lower the belt guide assembly 110 to a closed position.

Figure 3D:
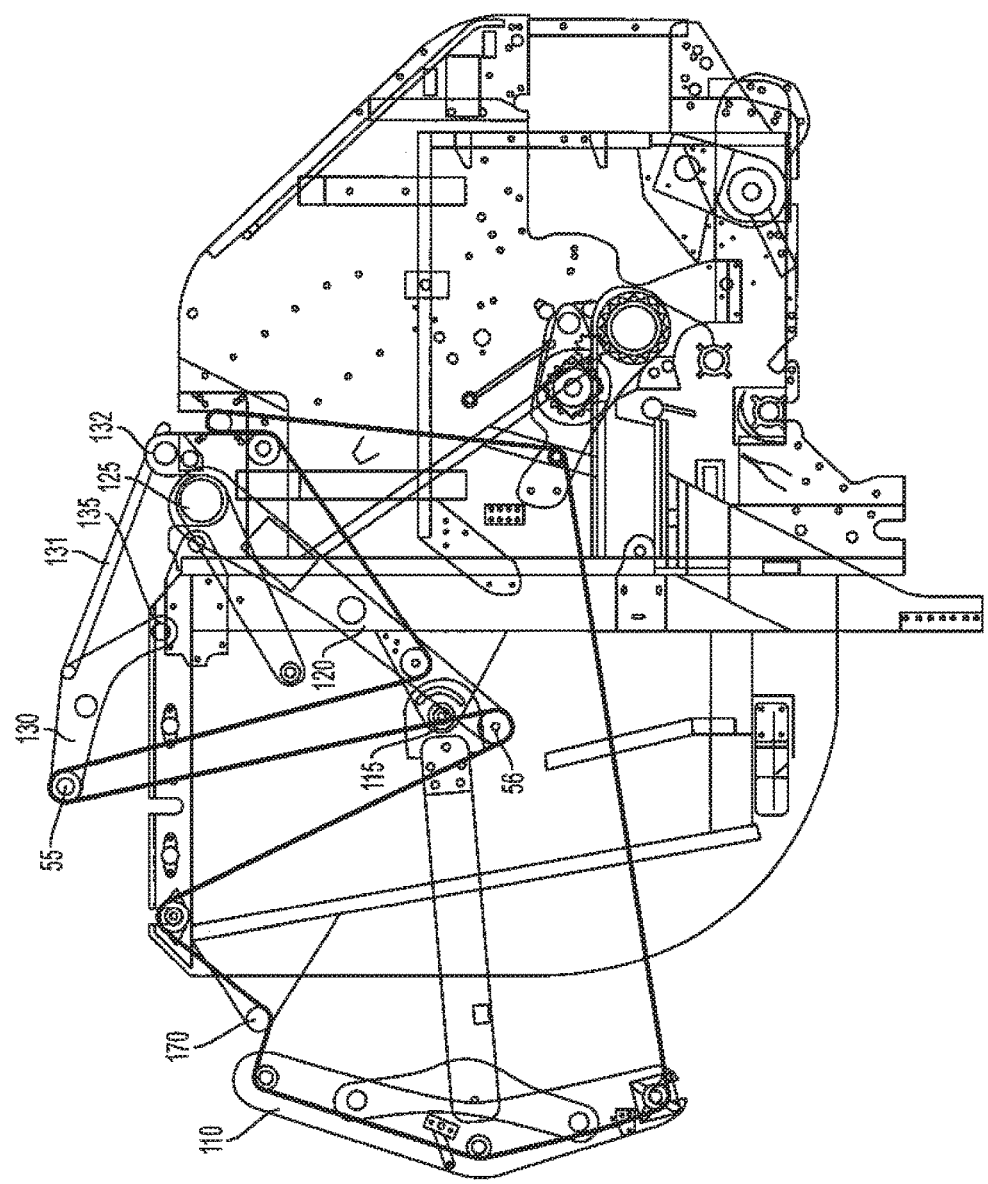

FIG. 3D depicts the harvester with the belt guide assembly 110 in a partially lowered position. As the belt guide assembly 110 moves downward in a radial motion around the belt guide assembly pivot point 115, slack in the surrounding baling belts 181 increases. Similar to FIG. 3B, the take-up arm 130 moves upward, allowing the movable roll of the take-up arm 55 to eliminate the slack in the baling belts 181. Upon the complete lowering of the belt guide assembly 110, the harvester returns to the embodiment depicted in FIG. 3A.

FIG. 4. depicts an embodiment of the harvester that does not comprises a take-up arm assembly. Instead, the harvester comprises an assembly assistance roll 405. When the belt guide assembly 110 moves upward in a radial motion around the belt guide pivot point 115, slack in the surrounding baling belts 181 increases. The movement of the serpentine arm 120 and the movable roll of the serpentine arm 56 eliminates some of this slack, as does the position of the back wrap roll 170 during the upward arc of the belt guide assembly 110. However, a certain amount of slack may still exist with an assembly assistance roll 405 in place of a take-up arm assembly. In some embodiments, the serpentine arm 120 may have the timing or speed of its radial motion adjusted in relation to the movement of the belt guide assembly 110 so that excess slack in the baling belts 181 may be kept to a minimum. In some embodiments, the assembly assistance roll is substantially stationary. In some embodiments, the assembly assistance roll is positioned in the upper section of the harvester, and between the back wrap roll 170 and the serpentine arm pivot point 125.

In some embodiments, the bale ejection system comprises one or more hydraulic tensioning actuators that extend to raise at least a first pair of arms extending from the sidewalls of the bale chamber to one or plurality of positions. In some embodiments, the first pair of arms pivot and can remain stationary at any angle above its closed position about a first pair of pivot points. In some embodiments, the belt guide assembly can be raised by extension of the tension actuators mechanically attached to the first pair of arms, and the first pair of arms are raised around the first pair of pivot points until the first pair of arms swings upwardly at no more than about 120 degrees from where the arms are positioned in a fully closed position. In some embodiments, the belt guide assembly can be raised by extension of the tension actuators mechanically attached to the first pair of arms, and the first pair of arms are raised around the first pair of pivot points until the first pair of arms swings upwardly at no more than about 115 degrees from where the arms are positioned in a fully closed position. In some embodiments, the belt guide assembly can be raised by extension of the tension actuators mechanically attached to the first pair of arms, and the first pair of arms are raised around the first pair of pivot points until the first pair of arms swings upwardly at no more than about 110 degrees from where the arms are positioned in a fully closed position. In some embodiments, the belt guide assembly can be raised by extension of the tension actuators mechanically attached to the first pair of arms, and the first pair of arms are raised around the first pair of pivot points until the first pair of arms swings upwardly at no more than about 105 degrees from where the arms are positioned in a fully closed position. In some embodiments, the belt guide assembly can be raised by extension of the tension actuators mechanically attached to the first pair of arms, and the first pair of arms are raised around the first pair of pivot points until the first pair of arms swings upwardly at no more than about 100 degrees from where the arms are positioned in a fully closed position. In some embodiments, the first pair of arms can swing upwardly from about 100 degrees to about 120 degrees from its fully closed position. In some embodiments, the first pair of arms can swing upwardly from about 105 degrees to about 120 degrees from its fully closed position. In some embodiments, the first pair of arms can swing upwardly from about 110 degrees to about 120 degrees from its fully closed position. In some embodiments, the first pair of arms can swing upwardly from about 115 degrees to about 120 degrees from its fully closed position. In some embodiments, the first pair of arms can swing upwardly from about 100 degrees to about 115 degrees from its fully closed position. In some embodiments, the first pair of arms can swing upwardly from about 100 degrees to about 110 degrees from its fully closed position. In some embodiments, the first pair of arms can swing upwardly from about 100 degrees to about 105 degrees from its fully closed position.

In some embodiments, the belt guide assembly is mechanically attached to one or more of the bale chamber rollers positioned in the front of the bale chamber, whereupon raising the belt guide assembly to any angle above its closed position causes the one or more bale chamber rollers to raise upward and/or rearward to kick out a bale within the bale chamber through the outlet at the rear of the bale chamber. In some embodiments, the belt guide assembly is mechanically attached to one or more bale chamber rollers attached to one or more of the bale chamber rolls positioned in the front of the bale chamber, wherein an operator of the belt guide assembly has the option of moving the one or more bale chamber rollers at any vector upward and/or laterally rearward when the belt guide assembly is raised to any angle above its closed position. In some embodiments, the agricultural harvester comprises one or more bale chamber rollers, each bale chamber roller moveable upon one or more axes so that, when the bale is evacuated from the bale chamber, the operator has an option to move the bale chamber rollers from a stationary position within the bale chamber to strike a bale within the bale chamber and cause the bale to exit through an outlet at the rear of the bale chamber at an accelerated rate as compared to a rate of speed at which the bale would evacuate the bale chamber without moving the bale chamber roller. In some embodiments the movable chamber roller is spring-loaded and mechanically attached to the belt guide assembly of the present invention.

In some embodiments, at least one, two, three, or more sensors are positioned within the bale chamber to detect the size of the bale within the bale chamber. In some embodiments, the bale chamber comprises at least one, two, three or more sensors that operably connected to an indicator light visible to the operator of the belt guide assembly and/or operably connected to a controller on the agricultural harvester within which the belt guide assembly is positioned. The controller may be engaged by the operator of the agricultural harvester when the agricultural harvester is functioning so that the operator may identify how large or small the bale is at a given time during operation. In some embodiments, the at least one, two, or three sensors within the bale chamber are automatically engaged to sense how large the bale is when the agricultural harvester is functioning. In some embodiments, the at least one, two, or three sensors within the bale chamber are automatically engaged to sense whether the bale chamber is at or near full capacity.

In some embodiments, the invention relates to an agricultural harvester that comprises the bale ejection system described herein. In some embodiments, the agricultural harvester is a machine chosen from: a combine, a round baler, a waste baler, and a cotton harvester.

The illustrated examples are provided to describe the invention in greater detail. Although the invention has been described with reference to exemplary embodiments, it is not limited thereto. For example, it is foreseeable that the belt guide assembly of the present invention could be used in modified round balers. Those skilled in the art will appreciate that numerous changes and modifications may be made to the disclosed embodiments of the invention and that such changes and modifications may be made without departing from the true spirit of the invention. It is therefore intended that the appended claims cover be construed to all such equivalent variations as fall within the true spirit and scope of the invention.

Various publications, including patents, published applications, technical articles and scholarly articles are cited throughout the specification. Each of these cited publications is incorporated by reference herein, in its entirety.

What is claimed is:

1. An agricultural harvester comprising:
    a bale chamber comprising a first sidewall and a second sidewall;
    an outlet at the rear of the bale chamber;
    a take-up arm positioned at a top of the baler;
    at least a first serpentine system arranged for the bale chamber, the first serpentine system comprising:
        a plurality of baling belt rollers in operable contact with one or more baling belts, the plurality of baling belt rollers comprising at least one baling belt roller in operable contact with the take-up arm, wherein the at least one baling belt roller in operable contact with the take-up arm is movable in a direction defined by a pivoting movement of the take-up arm, independent of movement of any other baling belt rollers in the baler; and
    a belt guide assembly, the belt guide assembly movable among a closed position and one or more open positions, comprising:
        a first pair of arms extending transversely from and affixed to a first pair of pivot points on the first and second sidewalls;
        one or more fixed members positioned at a distance defined by the length of the first pair of arms; and
        at least one roller rotatably mounted upon an axis transverse to the one or more fixed members;
    wherein the belt guide assembly uncovers the outlet through which the bale becomes ejected from the bale chamber when the belt guide assembly is raised upward into a partially open or fully open position from its closed position; and
    wherein the take-up arm pivots upward simultaneously or substantially simultaneously with the belt guide assembly when the belt guide assembly is raised upward into a partially open or fully open position from its closed position.

2. The agricultural harvester of claim 1, wherein the bale chamber is defined in a space between the first sidewall, the second sidewall, the belt guide assembly, and a plurality of rollers positioned between and attached to the first and second sidewalls; wherein the plurality of rollers support one or more baling belts; and wherein the at least one roller of the belt guide assembly defines the bottom of the bale chamber and supports a bale in the bale chamber when the belt guide assembly is in its fully closed position.

3. The agricultural harvester of claim 1, wherein the baler further comprises a motor and at least one tensioning actuator operatively coupled to at least one of the first pair of arms for facilitating the upward or downward movement of the belt guide assembly.

4. The agricultural harvester of claim 1, wherein the at least one baling belt roller in operable contact with the take-up arm moves above the top portion of the baler when the take-up arm pivots upward.

5. The agricultural harvester of claim 1, wherein the serpentine system further comprises at least one back wrap roller rotatably mounted about an axis transverse to the side walls of the bale chamber and positioned in the upper rear portion of the baler rearward to the other plurality of baling belt rollers.

6. The agricultural harvester of claim 5, wherein, upon raising the belt guide assembly to an open position at least half the distance between its fully open and its fully closed position, the at least one back wrap roller engages the one or a plurality of baling belts to reduce slack in the one or plurality of baling belts.

7. The agricultural harvester of claim of claim 1, wherein the agricultural harvester further comprises a rear door positioned in the most rear portion of the baler which is pivotally connected to a second pair of pivot points and at least partially obstructs the outlet at the rear of the bale chamber when the rear door is in a fully closed position.

8. The agricultural harvester of claim 1, wherein the serpentine system further comprises at least one serpentine arm or a pair of serpentine arms pivotally connected to one or a pair of pivot points whose ends are operably connected to a second moveable baling belt roller.

9. The agricultural harvester of claim 7, wherein, upon moving to one or more open positions, the rear door and the belt guide assembly move at different rates of speed.

10. The agricultural harvester of claim 1, wherein the agricultural harvester is a selected from: a round baler, cotton harvester, combine, or waste baler.

* * * * *